United States Patent [19]

Iwasawa

[11] Patent Number: 4,949,312
[45] Date of Patent: Aug. 14, 1990

[54] ULTRASONIC DIAGNOSTIC APPARATUS AND PULSE COMPRESSION APPARATUS FOR USE THEREIN

[75] Inventor: Hiroshi Iwasawa, Hachioji, Japan

[73] Assignee: Olympus Optical Co., Ltd., Tokyo, Japan

[21] Appl. No.: 339,113

[22] Filed: Apr. 17, 1989

[30] Foreign Application Priority Data

Apr. 20, 1988 [JP] Japan .................................. 63-95439
Apr. 28, 1988 [JP] Japan .................................. 63-104346
Jul. 19, 1988 [JP] Japan .................................. 63-178128
Jan. 19, 1989 [JP] Japan ...................................... 1-8581

[51] Int. Cl.$^5$ ............................................ G03B 42/06
[52] U.S. Cl. .................................... 367/7; 128/660.01
[58] Field of Search ...................... 367/7, 11, 100, 101, 367/102, 105; 73/626; 128/660.01

[56] References Cited

U.S. PATENT DOCUMENTS

| | | | |
|---|---|---|---|
| 4,425,634 | 1/1984 | Iino et al. | 367/105 |
| 4,449,209 | 5/1984 | Zehner et al. | 367/102 |
| 4,716,414 | 12/1987 | Luttrell et al. | 367/7 |

FOREIGN PATENT DOCUMENTS

46-10820 8/1971 Japan .
58-73345 5/1983 Japan .
63-8782 2/1988 Japan .
63-233369 9/1988 Japan .

Primary Examiner—Thomas H. Tarcza
Assistant Examiner—Daniel T. Pihulic
Attorney, Agent, or Firm—Stevens, Davis, Miller & Mosher

[57] ABSTRACT

An ultrasonic diagnostic apparatus for obtaining ultrasonic images of a body to be inspected by selectively using a plurality of ultrasonic vibrating elements having different frequency characteristics, including a chirp signal generating circuit for generating a chirp signal selected from a plurality of chirp signals each corresponding to respective ultrasonic vibrating elements, a plurality of pulse compression circuits each having a reference wave signal corresponding to respective chirp signals and compressing the echo signal by deriving a correlation of the echo signal with the selected reference signal, and a switching circuit for selecting one of the pulse compression circuits in accordance with the selected chirp signal corresponding to the ultrasonic vibrating element to be used.

15 Claims, 10 Drawing Sheets

ULTRASONIC DIAGNOSTIC APPARATUS AND PULSE COMPRESSION APPARATUS FOR USE THEREIN

Background of the Invention

Field of the Invention and Related Art Statement

The present invention relates to an ultrasonic diagnostic apparatus for diagnosing characteristics of samples such as living body by using an ultrasonic wave, and a pulse compression apparatus for use therein.

Heretofore, there has been proposed in, for instance Japanese patent application Publication Kokai Sho 58-73,345, an ultrasonic diagnostic apparatus in which the pulse compression method which has been utilized in the pulse radar is used. In this known ultrasonic diagnostic apparatus, there are merits that the detectable rang can be made long and the distance resolution can be increased, but has the following demerits mainly due to the fact that a special SAW (Surface Acoustic Wave) filter is used as a matching filter for effecting the pulse compression.

That is to say, since the ultrasonic diagnostic apparatus uses the low frequency and a wide frequency range, it is rather difficult to design the SAW filter satisfying such requirements. Further, in the ultrasonic diagnostic apparatus, in case of inspecting the living body having a large damping effect with the aid of the pulse reflection method, the filter characteristics have to be modified in the dynamic mode in accordance with the range from which the reflected echo is returned. However, in the SAW filter the filter characteristics are fixed by the pitch and length of the electrodes, so that it is practically impossible to obtain the SAW filter having the dynamic filter characteristics.

In order to remove the above problem, the applicant has proposed, in Japanese patent application Publication No. 63-233,369 (corresponding to U.S. patent application No. 107,497), the pulse compression apparatus for use in the ultrasonic diagnostic apparatus in which the echo signal is compressed by deriving the correlation with the aid of a correlation circuit by effecting the convolution-integrating in the time domain between the echo signal waveform and an impulse response waveform (reference wave). In this pulse compression apparatus for the ultrasonic diagnosis, since the SAW filter is not used and the pulse compression is carried out by deriving the correlation between the echo signal and the reference wave, the pulse compression is effected without being affected by the frequency and range and thus the dynamic filter characteristics can be realized. Therefore, it is possible to realize the ultrasonic diagnostic apparatus having the high resolution and sensitivity.

The inventor has conducted various experiments and has found that the pulse compression apparatus disclosed in the above mentioned Japanese patent application Publication No. 63-233,369 has a drawback such that the construction is liable to be complicated as can be understood from the embodiment illustrated in FIG. 7B of said Publication.

That is to say, in said ultrasonic diagnostic apparatus, the convolution-integrating between the echo signal and the reference signal is carried out by deriving instantaneous voltages of the echo signal from taps provided on a delay line such that the echo signal is delayed by the same time period and deriving a sum of currents passing through a reference resistor series to which the instantaneous voltages are applied. In order to obtain a plurality of reference waves corresponding to plural kinds of ultrasonic vibrators having different frequency characteristics, said reference resistor series is composed of a parallel connection of a plurality of resistors and the combination of these resistors is changed in accordance with an ultrasonic vibrating element to be used. In this manner, in the above mentioned pulse compression apparatus, it is necessary to provide a resistor switching circuit so that the correlation circuit is liable to be large in size, complicated in construction and expensive in cost.

SUMMARY OF THE INVENTION

The present invention has for its object to provide a novel and useful pulse compression apparatus which can mitigate the above mentioned drawbacks, can effect the pulse compression of the echo signal by using optimum reference signal waves for respective ultrasonic vibrating elements to be used and can be constructed simply.

It is another object of the present invention to provide an ultrasonic diagnostic apparatus which comprises the pulse compression apparatus mentioned above and can obtain ultrasonic image of the body with high resolution and sensitivity.

According to the invention, an ultrasonic diagnostic apparatus comprises an ultrasonic wave transmitting and receiving means including a plurality of ultrasonic vibrating elements having different frequency characteristics and transmitting an ultrasonic wave generated from a selected ultrasonic vibrating element and receiving an ultrasonic echo reflected from a body under inspection to produce an echo signal;

chirp signal generating means for generating a plurality of chirp signals each corresponding to respective ultrasonic vibrating elements and supplying one of the chirp signals corresponding to the selected ultrasonic vibrating element to said ultrasonic wave transmitting and receiving means to emit an ultrasonic chirp wave;

pulse compressing means for compressing the echo signal by deriving a correlation between the echo signal and a reference wave signal which is selected from a plurality of reference wave signals each corresponding to respective ultrasonic vibrating elements, said selected reference wave signal being corresponding to said selected ultrasonic vibrating element; and display means for displaying an ultrasonic image of the body on the basis of a compressed echo signal supplied from said pulse compressing means.

DESCRIPTION OF THE PREFERRED EMBODIMENTS

Figure 1:
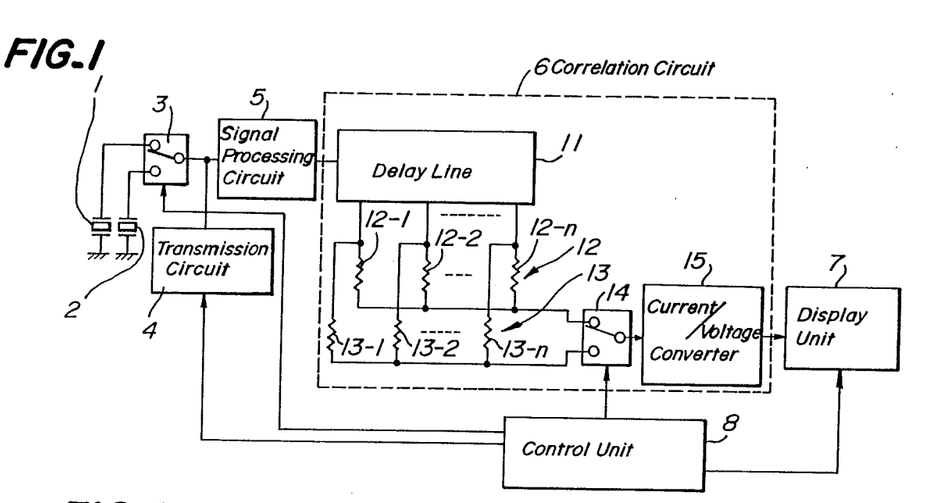
FIG. 1 is a schematic view showing the principal construction of a first embodiment of the ultrasonic diagnostic apparatus according to the present invention.

FIG. 1 is a block diagram illustrating the principal construction of an embodiment of the ultrasonic diagnostic apparatus according to the invention. The apparatus comprises two ultrasonic vibrators 1 and 2 having different frequency characteristics, a relay 3 for selecting either one of the vibrators, a transmission circuit 4 for generating a plurality of chirp signals each corresponding to respective vibrators, a signal processing circuit 5 for processing an echo signal received by the ultrasonic vibrator 1 or 2, a correlation circuit 6 for pulse-compressing the echo signal, a display unit 7 for displaying ultrasonic image in accordance with an output of the correlation circuit, and a control unit 8 for controlling the relay 3, transmission circuit 4 and display circuit 7. The correlation circuit 6 includes a delay line 11 which receives the output echo signal from the signal processing circuit 5 and has a plurality of taps, two series 12 and 13 of reference wave resistors 12-1~12-n and 13-1~13-n each corresponding to respective ultrasonic vibrators 1 and 2 and receiving output signals derived from the taps on the delay line 3, a relay 14 for selecting any one of the reference wave resistor series, and a current-voltage converter 15 for converting a sum of currents passing through a reference wave resistor series selected by the relay 14 into a voltage. Said relay 14 is controlled by the control unit 8 in accordance with an ultrasonic vibrating element to be used such that the corresponding reference wave resistor series 12 or 13 is selected.

Figure 2:
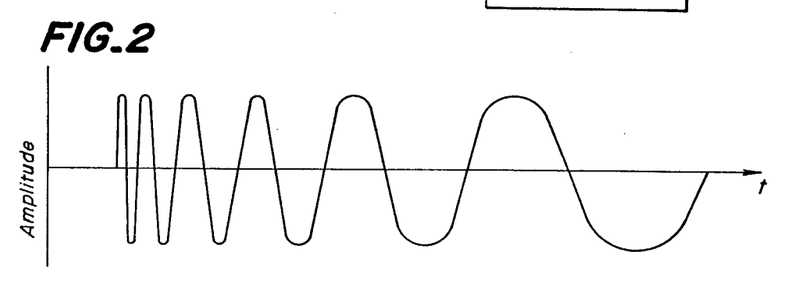
FIG. 2 is a waveform of an example of the chirp signal.

In FIG. 1, when the control unit 8 is operated to select the first ultrasonic vibrating element 1, then the relay 3 is changed into a position in which the first vibrating element 1 is connected into the circuit and the relay 14 is set to a position such that the first reference wave resistor series 12 is connected into the circuit. Under the condition of the circuit so far explained, a chirp signal is supplied from the transmission circuit 4 by means of the relay 3 to the ultrasonic vibrating element 1 in accordance with a transmission rate signal supplied from the control unit 8, and an ultrasonic chirp pulse is transmitted from the ultrasonic vibrating element 1 into a body under inspection. As shown in FIG. 2, the ultrasonic chirp pulse has a frequency varying in time. In the present embodiment, the frequency is decreased in accordance with the time t. Ultrasonic wave reflected by the body is received by the same ultrasonic vibrating element 1 and is converted into an electric signal, i.e. echo signal which is then supplied via the signal processing circuit 5 to the delay line 11 of the correlation circuit 6. The taps on the delay line are so arranged that signals which are delayed by the same time period are derived from these taps. In other words, the echo signal is sampled by said time period and at respective taps there are appeared sampled voltages. Since the relay 14 is set to select the first reference resistor series 12 corresponding to the first ultrasonic vibrating element 1, the sampled voltages are applied to the resistor series 12 and a sum of currents passing through the resistors 12-1 to 12-n of the relevant first resistor series is supplied to the current-voltage converter 15 and is converted to the voltage. In this manner, the the echo signal is convolution-integrated with the reference wave and the correlation is attained to compress the echo signal. Then, the pulse-compressed echo signal is supplied to the display unit 7 and is displayed thereon. When the control unit 8 is driven to select the second ultrasonic vibrating element 2, the relay 3 is changed into a position in which the second ultrasonic vibrating element 2 is selectively connected into the circuit and the relay 14 is switched into a position that the second reference resistor series 13 is connected into the circuit, so that the second ultrasonic vibrating element 2 is driven by the corresponding chirp signal and the ultrasonic chirp pulse is transmitted from the element 2 and the reflected chirp pulse is received by the same element 2. The received chirp pulse is compressed by means of the second reference resistor series 13 and the ultrasonic image of the body is displayed on the display unit 7.

In the manner explained above, in the present embodiment, there are provided two reference resistor series 12, 13 each corresponding to respective ultrasonic vibrating elements 1, 2 and one of these resistor series is selected in accordance with an ultrasonic vibrating element to be used by means of the relay 14, it is possible to effect the pulse compression in an optimum manner, while the whole apparatus can be made simple in construction.

Figure 3:
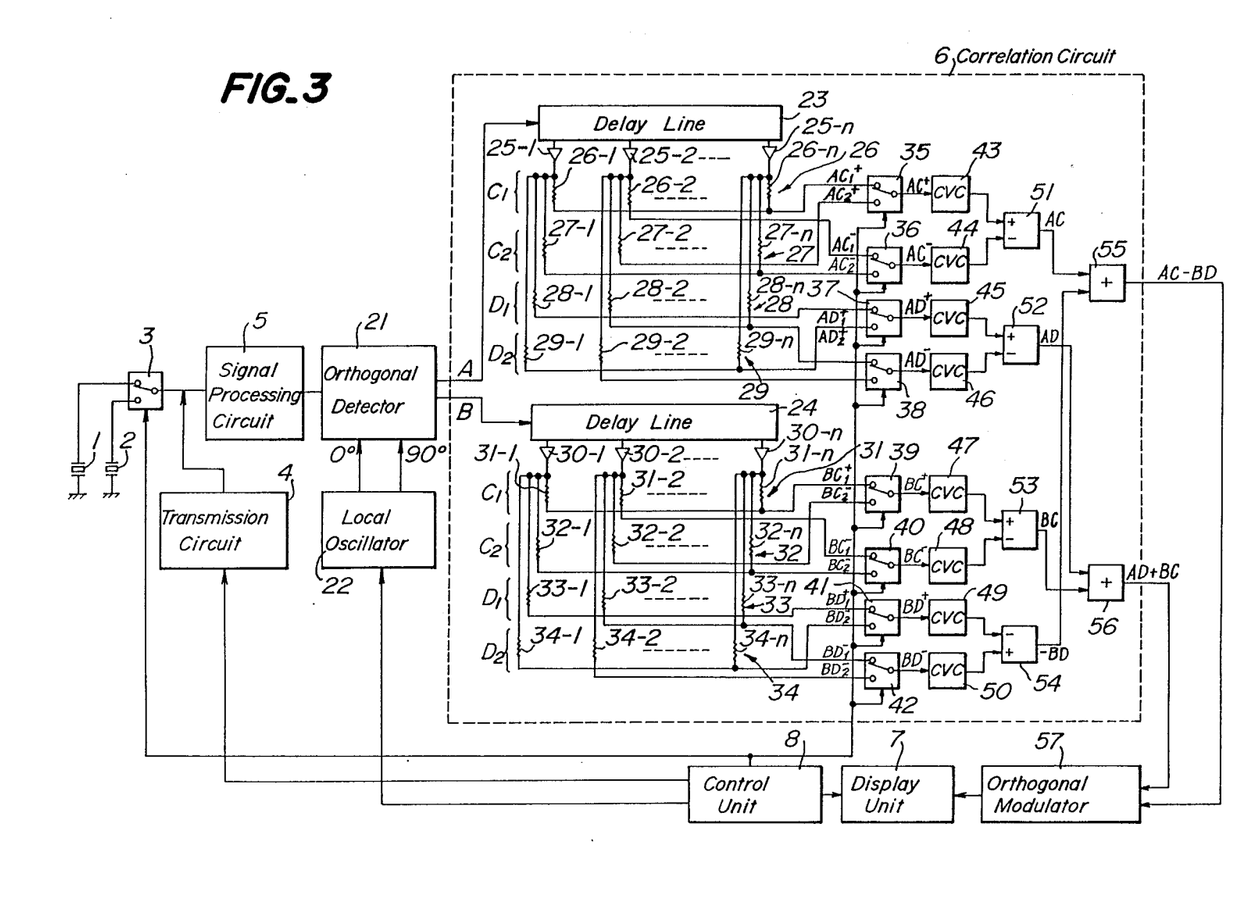
FIG. 3 is a block diagram showing the detailed construction of the first embodiment of the apparatus according to the invention.

FIG. 3 is a block diagram showing the detailed construction of the apparatus illustrated in FIG. 1. Any one of the ultrasonic vibrating elements 1 and 2 having different frequency characteristics is selected by operating the control unit 8 and a chirp signal corresponding to a selected element 1 or 2 is supplied from the transmission circuit 4 via the relay 3 in accordance with the transmission rate denoted by the control unit 8 to the relevant ultrasonic vibrating element, and the ultrasonic chirp pulse reflected from the body is received by the same element. Then, the echo signal is supplied by means of the relay 3 and signal processing circuit 5 to an orthogonal detector circuit 21. In the orthogonal detector circuit 21, the echo signal is heterodyne-converted in accordance with an output signal supplied from a local oscillator 22 into a complex signal (A+iB) having a frequency range which can be suitably processed by the correlation circuit 6. The complex signal thus obtained is supplied to the correlation circuit 6. It should be noted that the output frequency of the local oscillator 22 is changed by the control unit 8 in accordance with the ultrasonic vibrating element 1 or 2 to be used such that the frequency band of the echo signal can be converted into a given frequency range.

The correlation circuit 6 comprises the following elements:
first and second delay lines 23 and 24 corresponding to real and imaginary parts A and B, respectively of the complex signal supplied from the orthogonal detector circuit 21;
a first set of buffer amplifiers 25-1 to 25-n coupled with taps on the first delay line 23;

a plurality of reference resistor series 26 to 29 each including reference wave resistors 26-1 to 26-n, 27-1 to 27-n, 28-1 to 28-n and 29-1 to 29-n which are connected to the first set of buffer amplifiers;

a second set of buffer amplifiers 30-1 to 30-n connected to the taps on the second delay line 24;

a plurality of reference wave resistor series 31 to 34 each having resistors 31-1 to 31-n, 32-1 to 32-n, 33-1 to 33-n and 34-1 to 34-n coupled with the second set of the buffer amplifiers;

a plurality of relays 35 to 42 for selecting ones of reference wave resistor series 26 and 27, 28 and 29, 31 and 32, and 33 and 34;

a plurality of current-voltage converters (CVC) 43 to 50 for deriving a sum of currents flowing through reference wave resistors selected by the relays;

a plurality of subtracters 51 to 54 for forming a composition of outputs of the current-voltage converters 43 and 44, 45 and 46, 47 and 48, and 49 and 50; and adders 55 and 56 for deriving a composition of outputs from the subtracters 51 and 54, and 52 and 53.

In the present embodiment, the reference wave resistor series 26, 31 and 27, 32 correspond to the real parts ($C_1$ and $C_2$) of the reference wave signals ($C_1 + iD_1$) and ($C_2 + iD_2$), respectively for the first and second ultrasonic vibrating elements 1 and 2, and the reference wave resistor series 26, 31 and 28, 33 correspond to the imaginary parts ($D_1$ and $D_2$). The reference wave resistor series 26 and 31, and 28 and 33 have the same values and correspond to the first ultrasonic vibrating element 1, and similarly the reference wave resistor series 26 and 32, and 29 and 34 have the same values and correspond to the second ultrasonic vibrating element 2. The resistors have such values that the current passing through these resistors become equal to products of output voltages at the taps on the delay lines and instantaneous values of the reference wave. In accordance with the polarity of the reference wave, the currents passing through the reference resistor series are supplied to the current-voltage converter 43 or 44. For instance, resistors representing the positive amplitude of the reference wave are connected to the converter 43 and resistors denoting the negative polarity are connected to the converter 44. Then the outputs of the converters are combined by the subtracters 51 to 54. Each of the current-voltage converters 43 to 50 may be formed by the common base amplifier of complementary symmetric type, and each of the subtracters may be composed of the differential amplifier.

In the manner explained above, the reference wave resistor series 26 to 29 and 31 to 34 are selected by the relays 35 to 42 in synchronism with the relay 3 for selecting the ultrasonic vibrating elements 1 and 2. Then, the received echo signal is converted by the orthogonal detector circuit 21 into the complex signal ($A + iB$), and the complex signal is convolution-integrated in the correlation circuit 6 with the reference wave resistor series corresponding to the selected element 1 or 2 to effect the pulse compression. The outputs of the correlation circuit 6, i.e. an output ($AC - BD$) from the adder 55 and an output ($AD + BC$) from the adder 56 are supplied to an orthogonal modulator circuit 57 and are converted thereby into a frequency range which is easily treated in the display unit 7, and the modulated signal is displayed on the display unit.

In the present embodiment, when the control unit 8 is operated to select the first ultrasonic vibrating element 1, the relay 3 is changed into the side of this element 1 and the relays 35 to 42 are set to the side of the reference wave resistor series 26, 28, 31 and 34 corresponding to the element 1, so that the transmission and reception of the ultrasonic wave is carried out by means of the element 1 and the optimum pulse-compression is effected with the aid of the selected reference resistor series. Similarly, when the control unit 8 is operated to select the second ultrasonic vibrating element 2, the relay 3 is changed to the side of the second element 2 and the relays 35 to 42 are changed into the side of the reference wave resistor series 27, 29, 32 and 34 corresponding to the second element 2, so that the second element 2 performs the transmission and reception of the ultrasonic wave and the pulse-compression is carried out by means of the selected reference resistor series.

As stated above in detail, the reference resistor series 26,28, 31, 33 and 27,29, 32, 34 corresponding to the ultrasonic vibrating elements 1 and 2 having different frequency characteristics are provided and these resistor series are selected by the relays 35 to 42 to effect the desired pulse-compression in the correlation circuit 6, so that the construction of the apparatus can be made simple. Further, the resistors are switched at points at which the currents passing therethrough are added, and thus the number of switching relays can be reduced.

It should be noted that the number of the ultrasonic vibrating elements is not limited to two, but may be more than two. Further, when the ultrasonic vibrating elements are detachably secured to the apparatus, any one of the reference resistor series may be automatically selected by detecting a secured element. Then, it is not necessary to provide the relay 3 for selecting the elements.

Figure 4:
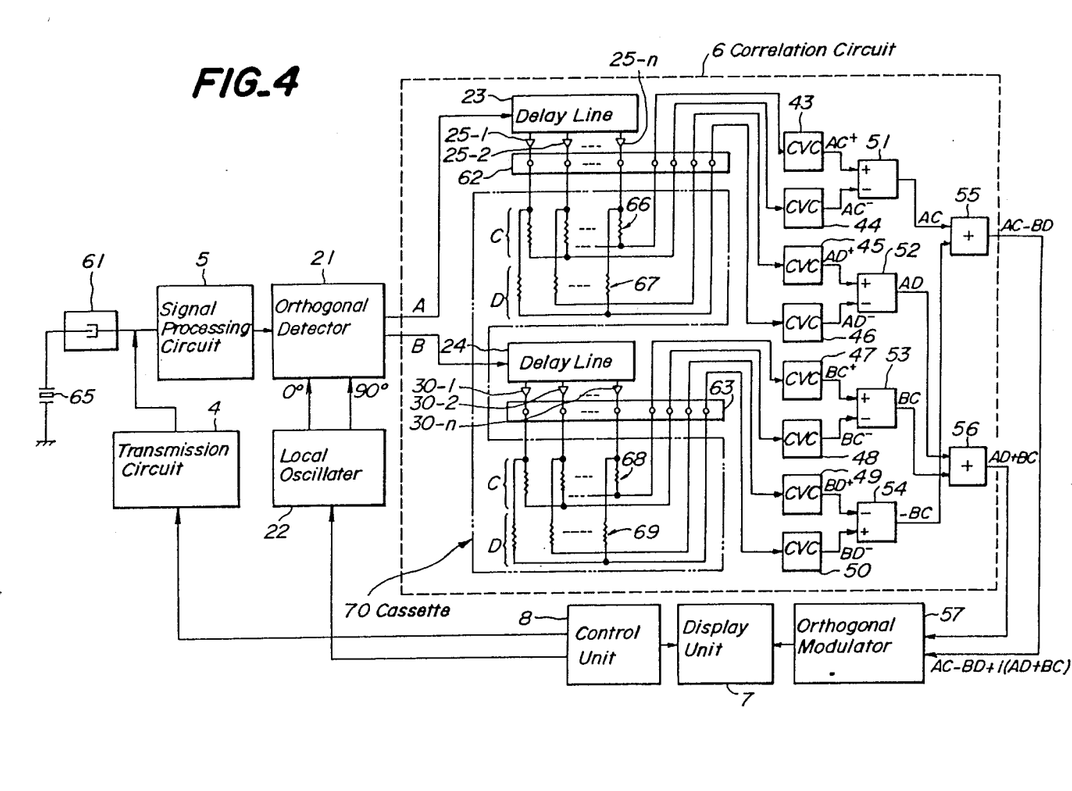
FIG. 4 is a block diagram illustrating a second embodiment of the apparatus according to the invention.

FIG. 4 is a block diagram showing a second embodiment of the ultrasonic diagnostic apparatus according to the invention. In the present embodiment, any one of plural ultrasonic vibrating elements, having different frequency characteristics can be detachably connected to the apparatus by means of a connector 61 and the reference wave resistor series in the correlation circuit 6 corresponding to respective elements are formed as separate cassettes. Then, a desired resistor series cassette is detachably connected to the buffer amplifiers 25-1 to 25-n, 30-1 to 30-n and current-voltage converters 43 to 50 by means of connectors 62 and 63 as illustrated in FIG. 4 by an imaginary line. The remaining construction of the present embodiment is same as that of the first embodiment.

In the second embodiment, when an ultrasonic vibrating element 65 is connected to the connector 61, it is sufficient to connect a cassette 70 including desired reference wave resistor series 66 to 69 to the connectors 62 and 63, so that a large number of ultrasonic vibrating elements can be utilized without making the construction of the apparatus complicated. Further, since only the reference resistors corresponding to the ultrasonic vibrating element to be used are connected to the outputs of the buffer amplifiers 25-1 to 25-n and 30-1 to 30-n, when the buffer amplifiers are constructed by the transistor emitter follower, the necessary driving faculty for the amplifiers can be reduced as compared with the embodiment shown in FIG. 3, so that the power consumption of the whole apparatus can be decreased. That is, to say, in the embodiment of FIG. 3, the reference wave resistor series 26, 28, 31, 33 for the first ultrasonic vibrating element 1 and the reference wave resistor series 27,29, 32, 34 for the second ultrasonic vibrating element 2 are switched by the relays 3t to 42 at a point just in front of the current-voltage converters 43 to 50, so that to the outputs of the buffer amplifiers 25-1 to 24-n, 30-1 to 30-n are always connected unselected resistor series and therefore, the load for the buffer amplifiers becomes large. Thus, in order to attain a sufficiently large dynamic range, it is necessary to increase the operation current and therefore, the power consumption of the whole circuit becomes large upon being compared that that of the embodiment shown in FIG. 4.

Moreover, a plurality of reference wave resistor series cassettes may be prepared for a single ultrasonic vibrating element. Then, the effect of the ultrasonic diagnosis can be improved by comparing a plurality of ultrasonic images obtained by using said plural cassettes with the single ultrasonic vibrating element.

Figure 5:
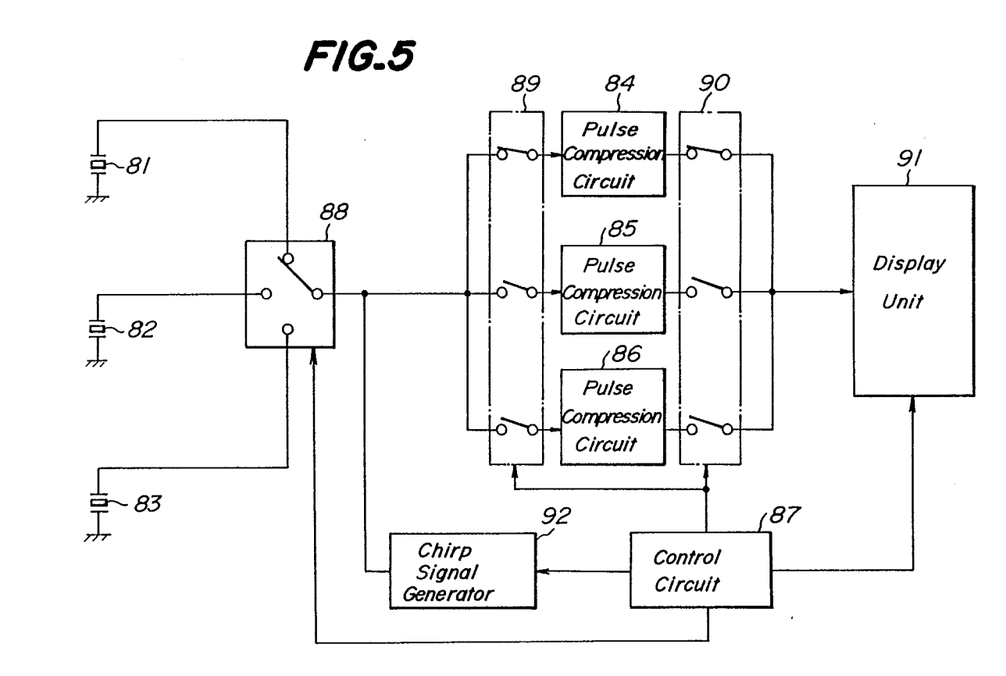
FIG. 5 is a block diagram illustrating a third embodiment of the apparatus according to the invention.

FIG. 5 is a block diagram showing a third embodiment of the apparatus according to the invention. In the present embodiment, one of three ultrasonic vibrating elements 81, 82 and 83 can be selectively connected to the circuit by means of a first switching circuit 88 and a corresponding one of pulse compression circuits 84, 85 and 86 can be also connected to the circuit by means of second and third switching circuits 89 and 90. Also in the present embodiment, it is possible to effect the pulse compression with the aid of an optimum reference wave and the pulse-compressed signal is displayed on a display unit 91. The first, second and third switching circuits 88, 89 and 90 and display unit 91 as well as a chirp signal generator 92 are controlled by a control circuit 87.

Figure 6:
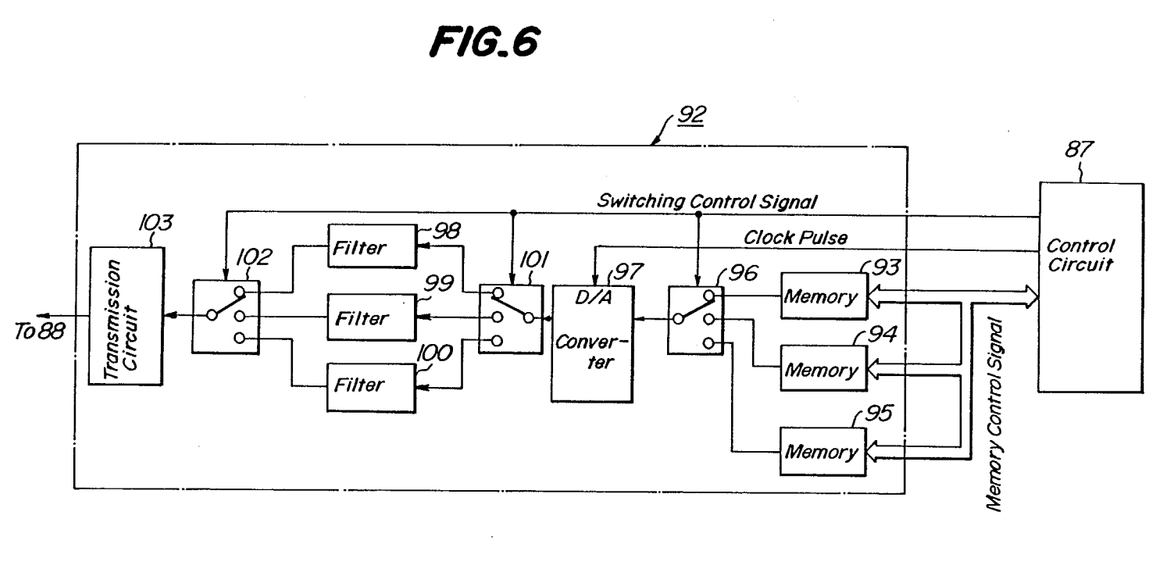
FIG. 6 is a block diagram depicting the construction of the chirp signal generating circuit shown in FIG. 5.

FIG. 6 is a block diagram showing the detailed construction of the chirp signal generating circuit 92 illustrated in FIG. 6. The chirp pulse generating circuit 92 comprises memories 93, 94 and 95 for storing data of the chirp signal waveforms corresponding to the ultrasonic vibrating elements 81, 82 and 83, respectively, a fourth switching circuit 96 for selecting one of the memories, a D/A converter 97 for converting the chirp waveform data selected by the fourth switching circuit into an analog chirp signal, filters 98, 99 and 100 each corresponding to respective elements 81, 82 and 83, fifth and sixth switching circuits 101 and 102 for selecting one of the filters, and a transmission circuit 103 for supplying an output signal from a selected filter to a ultrasonic vibrating element selected by the first switching circuit 88. The memories 93 to 95 are controlled by a memory control signal supplied from the control circuit 87 and the fourth to sixth switching circuits 96, 101 and 102 are controlled by a switching signal also supplied from the control circuit 87 such that desired memory and filter corresponding to the selected ultrasonic vibrating element are selectively connected into the circuit. In this manner, the digital data of the chirp signal waveform corresponding to the selected element is read out of the selected memory and is converted by the D/A converter 97 into the analog signal in synchronism with a clock pulse, and then unnecessary signal components contained in the analog signal are removed by the selected filter 98, 99 or 100 to produce the desired analog chirp signal. The analog chirp signal thus obtained is amplified in the transmission circuit 103 up to a suitable level for driving the selected ultrasonic vibrating element.

In the present embodiment, there are provided separate pulse compression circuits 84, 85 and 86 each corresponding to respective ultrasonic vibrating elements 81, 82 and 83 having different center frequencies and these pulse compression circuits are switched in accordance with a selected ultrasonic vibrating element, and therefore each pulse compression circuits can be designed to be corresponding to respective ultrasonic vibrating elements, so that it is sufficient to provide a single reference wave signal generator.

Thus, the construction of the apparatus of this embodiment can be made much simpler than the previous embodiments.

In the present embodiment, the first to sixth switching circuits 88, 89, 90, 101 and 102 are driven by operating a switch provided on a panel of the control circuit 87. It is also possible to arrange separate ultrasonic probes each containing respective ultrasonic vibrating elements 81 to 83 detachably secured to the apparatus by means of a single common connector. Then, the connector may comprise a means for automatically detecting the ultrasonic probe to generate a probe identifying signal and the second to sixth switching circuits may be controlled automatically by means of the probe identifying signal. It is matter of course that the first switching circuit 88 is dispensed width.

In the ultrasonic diagnostic apparatus in which a plurality of ultrasonic vibrating elements having different frequency characteristics are selectively used to improve the diagnostic efficiency, in order to effect the echo signal processing in an easy manner, the received echo signal is usually heterodyne-converted into a low frequency range. The heterodyne-conversion is carried out by mixing the received signal and a carrier signal in a mixer and an output signal form the mixer is passed through a low pass filter (LPF). However, in case of effecting the frequency conversion by means of a single mixer, if the received signal or the carrier signal is overlapped in the frequency band with the converted signal, there might be generated noise due to a leakage of the received signal or the carrier signal into the output signal of the mixer. Moreover, since the leaked signal components are partially overlapped with the converted signal, the noise could not be removed by the filter.

In order to avoid the above mentioned drawback, it has been proposed to use two mixers and the received signal is first converted into a frequency range which is far higher than that of the finally converted signal and that of the carrier by means of the first mixer, and then undesired signal components are removed by means of a band pass filter (BPF). Then, an output signal from the BPF is converted into a desired frequency band with the aid of the second mixer, and an output signal is further passed through the low pass filter to obtain a finally converted signal. Such a frequency conversion is called the double conversion.

If the above explained double conversion system is applied to the ultrasonic diagnostic apparatus having a plurality of the ultrasonic vibrating elements having different frequency characteristics, it would be necessary to provide a plurality of the carrier signal generators and BPFs in accordance with the kinds and frequencies of the ultrasonic vibrating elements, so that the whole apparatus is liable to be complicated in construction, large in size and expensive in cost to a large extent.

The present invention has another object to provide a novel and useful frequency converting apparatus which can overcome the above explained drawback and can be advantageously utilized in connection with the ultrasonic diagnostic apparatus.

In order to attain the above object, in the frequency converting apparatus according to the invention, signals received from ultrasonic vibrating elements having different frequency characteristics are converted by a first frequency converting means into high frequency range signals having the substantially same center frequency with the aid of carrier signals having different frequencies, desired high frequency signal components are derived by means of a first filter and are then converted by a second frequency converting mean into a low frequency range signal with the aid of a common carrier, and after that an output signal is passed through a second filter to derive a desired low frequency range signal.

Figure 7:
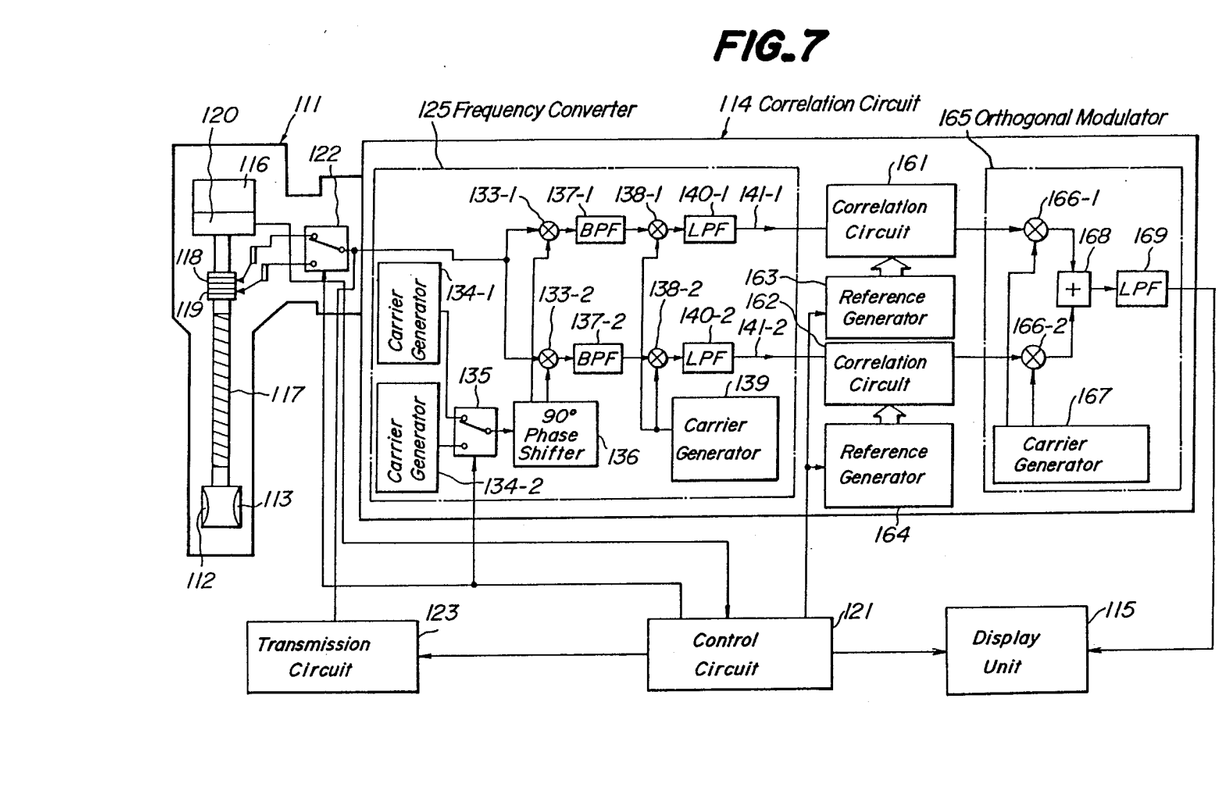
FIG. 7 is a block diagram showing a fourth embodiment of the apparatus according to the invention.

FIG. 7 shows the fourth embodiment of the ultrasonic diagnostic apparatus according to the invention in which the above mentioned frequency converting apparatus is installed. In the present embodiment, there are arranged two ultrasonic vibrating elements 112, 113 having different center frequencies in an ultrasonic probe 111, and any one of the elements can be selectively used to project an ultrasonic chirp wave toward a living body to be diagnosed and an ultrasonic echo reflected by the body is received by the same element and is converted into an electric echo signal. Then, the echo signal is processed in a correlation circuit 114 with the aid of a reference wave signal to effect the pulse compression, and an ultrasonic image is displayed on a display unit 115. The ultrasonic vibrating elements 112 and 113 are rotated by means of a motor 116 via a flexible shaft 117 and electric conductors (not shown) connected to the elements are extended within the shaft and are connected to slip rings 118 and 119. Positional information of the elements 112 and 113 is detected by an encoder 120 coupled with the motor 116 and is supplied to a control circuit 121. In the control circuit 121, a motor servo circuit is controlled by the position information supplied from the rotary encoder 120. The control circuit 121 also controls the display unit 115.

Any one of the ultrasonic vibrating elements 112 and 113 can be selected by the control unit 121 via a relay 122. Then, to the selected elements 112 or 113 is supplied a corresponding chirp signal from a transmission circuit 123 via the relay 122 under the control of the control unit 121 and the ultrasonic chirp pulse is emitted from the element into the body. The ultrasonic echo reflected from the body is received by the relevant element and the converted electrical echo signal is supplied to a frequency converting circuit 125 provided in the pulse compressing correlation circuit 114 via the relay 122.

In the frequency converting circuit 125, the input echo signal is supplied to one inputs of mixers 133-1 and 133-2, to the other inputs of which are supplied carrier signals having phases mutually shifted by 90 degrees, said carriers being supplied from any one of carrier generating circuits 134-1 and 134-2 via a relay 135 and a 90 degree phase shifter 136. Thus, the input echo signal is shifted toward a high frequency range and at outputs of the mixers 133-1 and 133-2 there are derived complex signal components. The relays 122 and 135 are controlled by the control circuit 121 such that when the element 112 is selected, the carrier signal generating circuit 134-1 is selected and when the element 113 is selected, the carrier signal generating circuit 134-2 is selected. It should be noted that in the present embodiment, the ultrasonic vibrating elements 112 and 113 have the frequency ranges of 3 to 11 MHz and 5 to 15 MHz, respectively, and the carrier signal generating circuits 134-1 and 134-2 generate the carrier signals having the frequencies of 53 MHz and 50 MHz, respectively.

The output signals from the mixers 133-1 and 133-2 are supplied via BPFs 137-1 and 137-2, respectively to one inputs of mixers 138-1 and 138-2, respectively, to the other inputs of which are supplied a common carrier signal generated by a carrier generation circuit 139.

By means of the mixers 138-1 and 138-2, the output signals from the BPFs 137-1 and 137-2 are converted into a lower frequency band. Then, the outputs from the mixers 138-1 and 138-2 are passed through LPFs 140-1 and 140-2, respectively to obtain desired complex signals 141-1 and 141-2 having noise removed therefrom. The carrier signals generated by the carrier generating circuit 139 has a frequency of 60 MHz.

Now the operation of the frequency converting circuit 125 will be explained with reference to signal waveforms illustrated in FIGS. 8A to 8D.

Figure 8A:
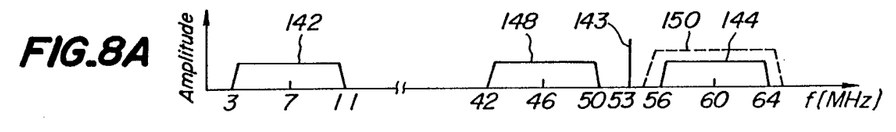
FIGS. 8A to 8D are diagrams for explaining the operation of the frequency converting circuit shown in FIG. 7.
Figure 8B:
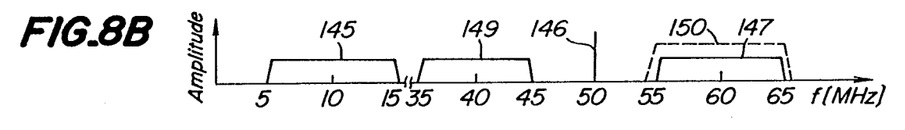

When the ultrasonic vibrating element 112 and carrier signal generating circuit 134-1 are selected by the relays 122 and 135, respectively, a frequency band 142 of the input echo signal is converted into a high frequency band 144 having the center frequency of 60 MHz due to the fact that the input echo signal is mixed with the carrier signal 143 having the frequency of 53 MHz and derived from the carrier generating circuit 134-1 via the 90° phase shifting circuit 136 as shown in FIG. 8A. Similarly, when the ultrasonic vibrating element 113 and carrier signal generating circuit 134-2 are selected by the relays 122 and 135, respectively, a frequency band 145 of the input echo signal is converted into a high frequency band 147 having the center frequency of 60 MHz due to the fact that the input echo signal is mixed with the carrier signal 146 having the frequency of 50 MHz and derived from the carrier generating circuit 134-2 via the 90° phase shifting circuit 136 as illustrated in FIG. 8B. In the outputs from the mixers 133-1 and 133-2 there are included undesired components 148 and 149 in addition to the desired high frequency range signal components 144 and 147 as depicted in FIGS. 8A and 8B. However, since the input echo signals are converted into the high frequency range signals having the same center frequency of 60 MHz, the undesired signal components 148 and 149 can be removed by the same BPFs 137-1 and 137-2 whose frequency ranges are set as represented by a broken line 150.

The output signal from the BSPs 137-1 and 137-2 are mixed with the carrier signal having the frequency of 60 MHz supplied from the carrier signal generating circuit 139 in the mixers 138-1 and 138-2 and are converted to the low frequency range. Since both the output signals of the BPFs have the same center frequency of 60 MHz, the carrier signal generating circuit 139 can be commonly used for both the mixers and thus the construction becomes simple. The output low frequency rang signals from the mixers 138-1 and 138-2 are passed through the LPFs 140-1 and 140-2 and spurious components are removed thereby. In this manner, it is possible to obtain the desired complex signals 141-1 and 141-2 of the low frequency range.

Figure 8C:
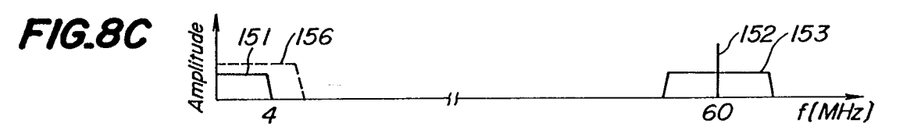
Figure 8D:
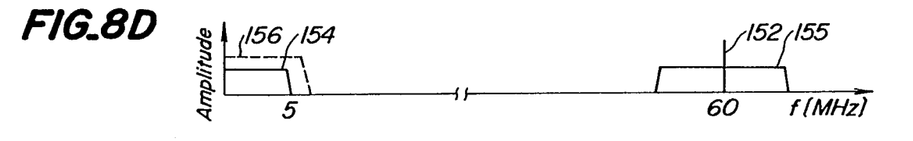

That is to say, the output signals from the mixers 138-1 and 138-2 contain, in addition to the desired signal of the low frequency range, the undesired signal components such as the leakage signal of the carrier of 60 MHz from the carrier signal generating circuit 139 and high frequency signal 153 as shown in FIG. 8C in case that the element 112 is used, and the leakage signal 152 of the carrier signal of 60 MHz and high frequency range signal 155 in addition to the desired signal 154 of the low frequency range in case of the element 113 as illustrated in FIG. 8D, but these undesired components can be removed by setting the frequency characteristics of the LPFs 140-1 and 140-2 as shown by broken lines 156 in FIGS. 8C and 8D.

As illustrated in FIG. 7, the complex signals 141-1 and 141-2 from the frequency converting circuit 125 are supplied to correlation circuits 161 and 162, respectively. In the correlation circuits 161 and 162, the complex signals 141-1 and 141-2 are processed under the control of the control circuit 121 by deriving the correlation of the complex signals with any one of reference wave signals generated by reference wave signal generating circuits 163 and 164, the reference wave signals being selected in accordance with the selection of the ultrasonic vibrating elements 112 and 113. In this manner, the pulse compression is carried out for the complex signals 141-1 and 141-2 and the outputs from the correlation circuits 161 and 162 are supplied to an orthogonal modulation circuit 165.

In the orthogonal modulation circuit 165, the outputs from the correlation circuits 161 and 162 are supplied to one inputs of mixers 166-1 and 166-2, to the other inputs of which are supplied a carrier signal generated by a carrier signal generating circuit 167.

Thus, the input signals are converted into a frequency range suitable for the display unit 115. Output signals from the mixers 166-1 and 166-2 are added to each other in an adder 168 and an output of the adder is supplied to the display unit 115 by means of an LPF 169, and the ultrasonic image is displayed on the display unit 115 under the control of the control circuit 121. The carrier signal supplied from the carrier generating circuit 167 has a frequency of 8 MHz. Therefore, when the element 112 is selected, the frequency band of the output signal of the orthogonal modulating circuit 165 is 4 to 12 MHz and when the element 113 is used, the output signal of the orthogonal modulating circuit has the frequency band of 3 to 13 MHz. Then, the low pass filter 169 is sufficient to pass the signal components having the frequency range lower than 13 MHz.

Figure 9:
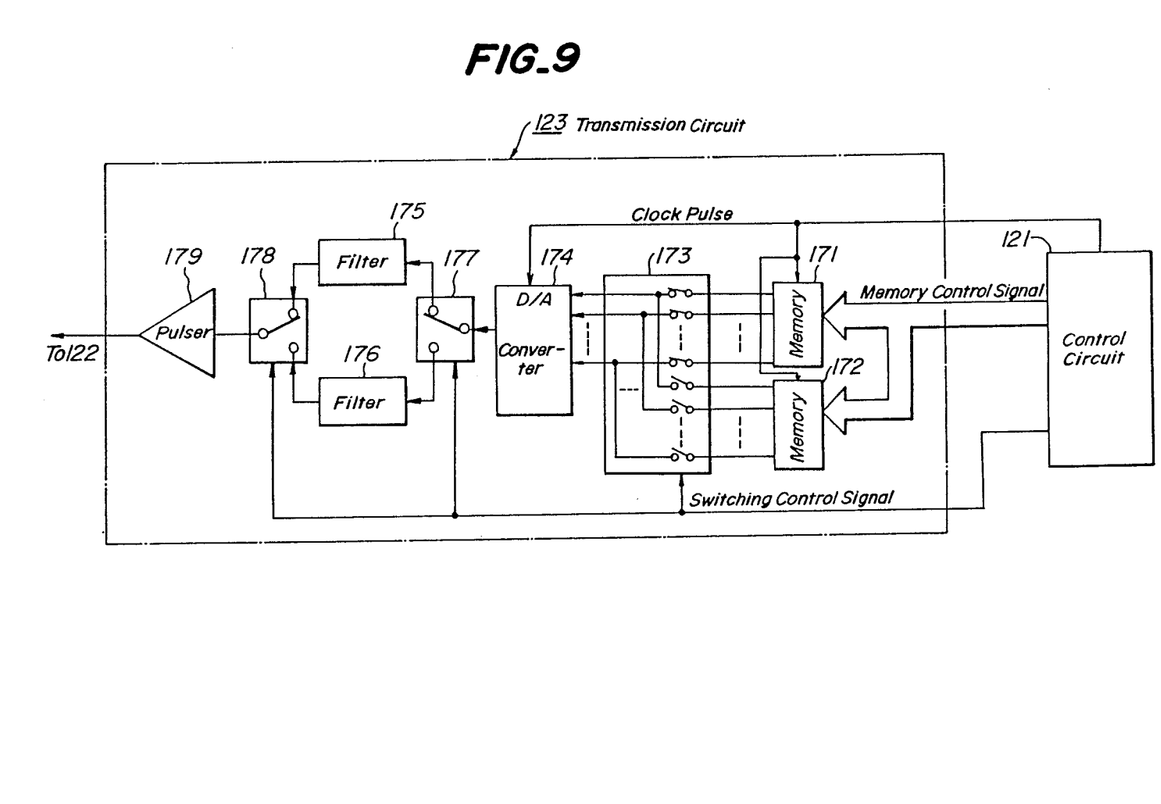
FIG. 9 is a block diagram representing the construction of the transmitting circuit illustrated in FIG. 7.

FIG. 9 is a block diagram depicting an embodiment of the transmission circuit 123 shown in FIG. 7. The transmission circuit 123 comprises memories 171 and 172 for storing digital data of chirp signal waveforms corresponding to the ultrasonic vibrating elements 112 and 113, a multiplexer 173 for selecting any one of the memories and reading the chirp signal data from the selected memory, a D/A converter 174 for converting the read out digital data into an analog signal, filters 175 and 176 each corresponding to respective elements, first and second switching circuits 177 and 178 for selecting any one of the filters, and a pulser 179 for sending an output signal from the selected filter. The memories 171 and 172 are controlled by memory control signals (address signal, enable signal) supplied from the control circuit 121, and the multiplexer 173 and first and second switching circuits 177 and 178 are controlled by switching control signals supplied from the control circuit 121 such that the memory and filter corresponding to the selected ultrasonic vibrating element are operated. Then, the digital chirp wave data is converted in the A/D converter 174 into the analog chirp signal in synchronism with the clock pulse corresponding to the selected memory under the control of the control circuit 121, and undesired components in the analog signal are removed by means of the filter to obtain the desired chirp signal. The chirp signal is amplified by the pulser 179 to such a level that it could energize the selected ultrasonic vibrating element.

In the present embodiment, the orthogonal detecting circuit of double conversion can be constructed by a smaller number of circuit elements, because it is not necessary to prepare the filters the number of which is equal to that of the kinds of echo signals and further only a single carrier is required for the second stage mixer, so that the echo signals can be processed easily.

The present invention is not limited to the embodiments explained above, but many alternations and modifications can be conceived by those skilled in the art. For instance, it is possible to store the digital data of the reference signals for the plural ultrasonic vibrating elements in ROM or RAM, and any desired digital data corresponding to a selected element is read out of the memory and is A/D-converted into the analog reference signal. It is also possible to use IC memory cards in which the reference data is stored and any desired one of the cards may be selectively inserted into the apparatus to generate the reference signal.

As explained above, according to the invention, it is possible to derive any one of a plurality of reference signals corresponding to a plurality on the ultrasonic vibrating elements can be obtained by means of the simple construction.

In the embodiment shown in FIG. 7, parts of the frequency conversion circuit and the pulse compression circuit are commonly constructed, but according to the invention, they may be constructed completely separately as will be explained hereinbelow.

Figure 10:
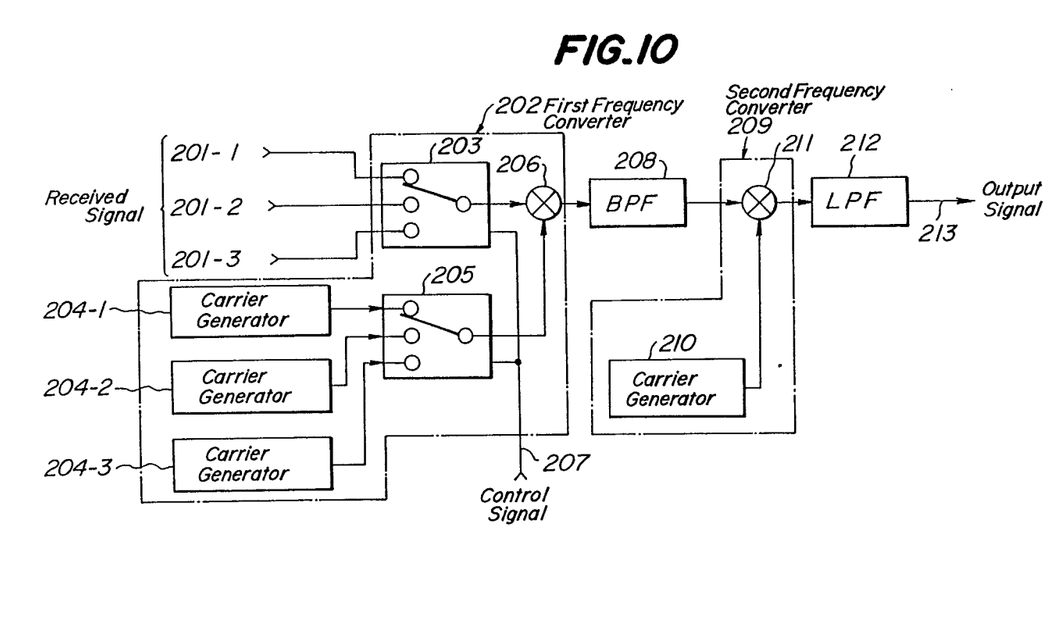
FIG. 10 is a block diagram showing a fifth embodiment of the apparatus according to the invention.

FIG. 10 is a block diagram illustrating another embodiment of the frequency converting circuit.

The signals 201-1, 201-2 and 201-3 received by a plurality of ultrasonic vibrating elements are supplied to a first frequency converting circuit 202. The first frequency converting circuit 202 comprises a relay 203 for selecting one of the received signals, carrier signal generating circuits 204-1, 204-2 and 204-3 each corresponding to respective received signals 201-1, 201-2 and 201-3 for converting them into high frequency band signals having substantially the same center frequency, a relay for selecting one of the converted signals, and a mixer 206 for combining output signals from the relays 203 and 205. The relay 203 and 205 are controlled by a control signal 207 in conjunction with each other so that corresponding received signal and carrier signal generating circuit are selected. The output signal from the mixer 206 of the first frequency converting circuit 202 is supplied to a band pass filer (BPF) 208 constituting the first filter and undesired components and leakages of the received signal and carrier signal are removed, and then is supplied to a second frequency converting circuit 209. The second frequency converting circuit 209 comprises a single common carrier signal generating circuit 210 for converting the output signal of the BPF 208 into a low frequency band signal, and a mixer 211 for combining the carrier signal with the output of the BPF 208. An output signal from the mixer 211 of the second frequency converting circuit 209 is supplied to a low pass filter (LPF) 212 constituting the second filter to derive an output signal 213 having undesired components removed therefrom.

Figure 11A:
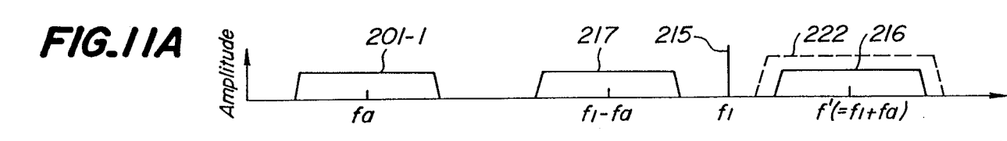
FIGS. 11A to 11D are frequency spectrums for explaining the operation of the apparatus depicted in FIG. 10.

In the present embodiment, corresponding ones of the received signals 201-1, 201-2, 201-3 and the carrier signal generating circuits 204-1, 204-2, 204-3 are selected under the control of the control signal 207, and the output signals from the mixer 206 are converted into the same high frequency band. For instance, for the received signal 2-01-1 having the center frequency of $f_a$, the carrier signal generating circuit 204-1 generating the carrier having the frequency of $f_1$ is selected as illustrated in FIG. 11A. Then, the received signal is converted into a higher frequency band signal 216 having a center frequency of $f'(=f_1+f_a)$. In this case, the following equation is satisfied.

$$\sin 2\pi f_1 t \cdot \sin 2\pi f_a t = \tfrac{1}{2}\{\cos 2\pi(f_1-f_a)t - \cos 2\pi(f_1+f_a)t\}$$

Figure 11B:
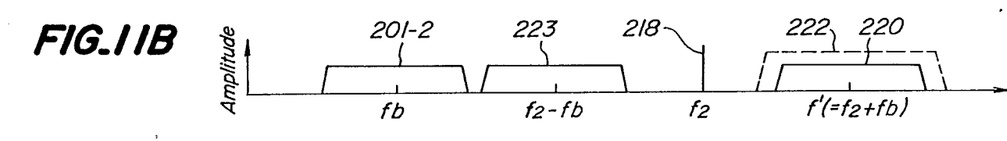
Figure 11C:
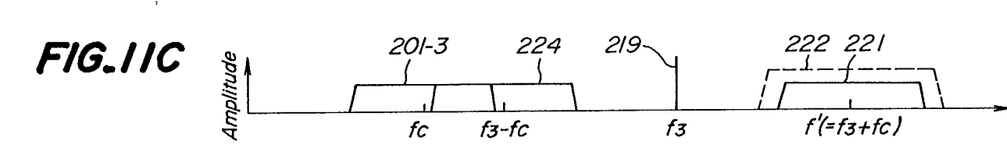

As can be understood from the above equation, there is also produced a signal band 217 having the center frequency of $f_1-f_a$ which is unnecessary. Similarly, as shown in FIGS. 11B and 11C, for the received signals 201-2 and 201-3 having the center frequencies $f_b$ and $f_c$, respectively, the carrier signal generating circuits 204-2 and 204-3 generating the carrier signals 218 and 219 having the frequencies of $f_2$ and $f_3$, respectively are selected, and these received signals are converted into higher frequency band signals 220 and 221, respectively having the center frequency of $f'(=f_b+f_2=f_c+f_3=f_a+f_1)$. In this manner, all the output signals from the mixer 206 ar converted to the high frequency bands 216, 220 and 221 having the same center frequency f', so that by setting the frequency characteristics 222 of the BPF 208 having the center frequency of f' as shown in FIGS. 11A–11C, the undesired components can be effectively removed with the aid of the single BPF 208.

Figure 11D:
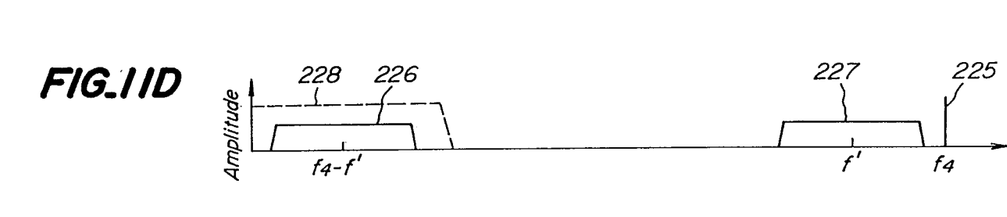

The output signal of the BPF 208 is mixed in the mixer 211 with the carrier signal 225 of frequency $f_4$ supplied from the carrier generating circuit 210 and is converted into a desired low frequency band signal 226 as illustrated in FIG. 11D. In the output from the mixer 211 there are produced undesired components such as higher band (not shown) having the center frequency of $f_4+f'$, leakages of the carrier signal and input signal. These undesired components can be simply removed by setting the frequency characteristics of the LPF 212 as shown by a broken line 228 in FIG. 11D. In this manner, the desired low frequency band signal 226 can be derived.

As explained above, in the preferred embodiment of the invention, the double conversion circuit for converting plural kinds of signals having different frequency bands can be constructed simply, because it is no more necessary to arrange filters the number of which is equal to that of the input signals and further only a single carrier is required in the second mixer.

It should be noted that in order to remove the undesired components with the aid of the BPF 208 and LPF 212 having no sharp frequency characteristics, it is preferable to convert the input signals to the higher frequency bands 201-1 to 201-3 by using the carrier signals having the higher frequencies. For example, the lowest frequency of the bands 201-1 to 201-3 is higher than the uppermost frequency of the received signals by three to four times.

It should be further noted that the above mentioned frequency conversion circuit may be provided in the signal processing circuit 5 shown in FIG. 1.

What is claimed is:

1. An ultrasonic diagnostic apparatus comprising:
   an ultrasonic wave transmitting and receiving means, including a plurality of ultrasonic vibrating elements having different frequency characteristics, for transmitting an ultrasonic wave generated from a selected ultrasonic wave generated from a selected ultrasonic vibrating element and receiving an ultrasonic echo reflected from a body under inspection to produce an echo signal;
   chirp signal generating means for generating a plurality of chirp signals each corresponding to respective ultrasonic vibrating elements and supplying one of the chirp signals corresponding to said selected ultrasonic vibrating element to said ultrasonic wave transmitting and receiving means to emit an ultrasonic chirp wave;
   means for providing a plurality of reference signals each corresponding to respective ones of said ultrasonic vibrating elements;
   pulse compressing means for compressing the echo signal by deriving a correlation between the echo signal and a reference wave signal which is selected from said plurality of reference wave signals, said selected reference wave signal corresponding to said selected ultrasonic vibrating element; and
   display means for displaying an ultrasonic image of the body in accordance with a compressed echo signal supplied from said pulse compressing means.

2. An apparatus according to claim 1, wherein said pulse compressing means comprises a delay line having a plurality of taps provided thereon for deriving echo signals which are delayed by different time periods, a plurality of resistor series each corresponding to respective reference signals and including a plurality of resistors connected to said taps, and a switching means for switching said resistor series in accordance with the selected ultrasonic vibrating element.

3. An apparatus according to claim 1, wherein said pulse compressing means comprises a plurality of pulse compression circuits each of which compresses respective echo signals supplied from respective ultrasonic vibrating elements with the aid of respective reference signals, and a switching circuit for switching said plurality of said pulse compression circuits in accordance with the selected ultrasonic vibrating element.

4. An apparatus according to claim 1, wherein said pulse compressing means comprises a storing means for storing a plurality of reference wave signals each corresponding to respective ultrasonic vibrating elements, and a switching means for selectively reading a reference wave signal corresponding to the selected ultrasonic vibrating element out of said storing means.

5. An apparatus according to any one of claims 2, 3 & 4, wherein said chirp signal generating means comprises a plurality of memory circuits each storing respective one of a plurality of chirp signal waveforms, and a further switching means for switching said plurality of memory circuits in conjunction with said switching means.

6. An apparatus according to claim 1, wherein the apparatus further comprises a frequency converting means connected between said ultrasonic wave transmitting and receiving means and said pulse compressing means and for converting a plurality of echo signals having different frequency bands, which are generated when said plurality of ultrasonic vibrating elements are used, into the substantially same frequency band echo signal.

7. An apparatus according to claim 1, wherein said frequency converting means comprises a first frequency conversion circuit for mixing the echo signal supplied from said ultrasonic wave transmitting and receiving means with a carrier signal to convert the echo signal into a high frequency band signal, said carrier signal being selected from a plurality of carrier signals each corresponding to respective ultrasonic vibrating elements, a first filter circuit for deriving a desired high frequency band signal from said high frequency band signal supplied from said first frequency conversion circuit, a second frequency conversion circuit for converting the desired high frequency band signal supplied from the first filter circuit into a low frequency band signal with the aid of a common carrier signal, and a second filter circuit for deriving a desired low frequency band signal from said low frequency band signal supplied from said second frequency conversion circuit.

8. An apparatus according to claim 1, wherein said pulse compressing means comprises an orthogonal detector circuit for converting said echo signal into real and imaginary signals, real and imaginary pulse compression circuits for compressing said real and imaginary signals in accordance with real and imaginary reference signals, respectively, and an orthogonal modulation circuit for combining output signals from said real and imaginary pulse compression circuits.

9. An apparatus according to claim 8, wherein said orthogonal detector circuit comprises a plurality of carrier signal generating circuits each generating carrier signals corresponding to respective one of said plurality of chirp signals, a switching circuit for selecting one of said plurality of carrier signals, a phase shifting circuit for shifting a phase of the carrier signal selected by said switching circuit by 90 degrees to derive a phase shifted carrier signal, first and second mixers for mixing the echo signal with the carrier signal and phase shifted carrier signal, respectively to convert the echo signal into real and imaginary signals, respectively, first and second band pass filters for deriving desired high frequency components from the real and imaginary signals, respectively, a single common carrier signal generating circuit for generating a common carrier signal having a frequency which is equal to a sum of the center frequency of the chirp signal and the frequency of the carrier signal, third and fourth mixers for combining the desired high frequency components of the real and imaginary signals with said common carrier signal, and first and second low pass filters for deriving desired low frequency components from output signals supplied from the third and fourth mixers.

10. An apparatus according to claim 1, wherein the apparatus further comprises an ultrasonic probe having a flexible insertion section insertable into a cavity of the body, a bending section arranged at a distal end of the insertion section, and a distal end section having the ultrasonic vibrating element installed therein, and an inspection device to which said ultrasonic probe can be detachably secured, said inspection device having the chirp signal generating means, pulse compression means and displaying means installed therein.

11. A pulse compression apparatus for use in an ultrasonic diagnostic apparatus in which an ultrasonic chirp wave having a frequency varying in time is emitted toward a body under inspection, an ultrasonic wave reflected from the body is received to derive an echo signal, the echo signal is pulse-compressed by deriving a correlation with a reference wave signal, and an ultrasonic image of the body is displayed in accordance with the pulse-compressed echo signal, comprising:

a pulse compressing means having a plurality of reference signals each corresponding to a respective one of a plurality of ultrasonic vibrating elements having different frequency characteristics;

means for selecting a reference wave signal corresponding to an ultrasonic vibrating element to be used; and means for pulse-compressing the echo signal by deriving a correlation with the selected reference signal.

12. An apparatus according to claim 11, wherein said pulse compressing means comprises a delay line having a plurality of taps provided thereon for deriving echo signals which are delayed by different time periods, a plurality of resistor series each corresponding to respect reference wave signals and including a plurality of resistors connected to said taps, and a switching means for switching said resistor series in accordance with the selected ultrasonic vibrating element.

13. An apparatus according to claim 11, wherein said pulse compressing means comprises a plurality of pulse compression circuits each of which compresses respective echo signals supplied from respective ultrasonic vibrating elements with the aid of respective reference wave signals, and a switching circuit for switching said plurality of said pulse compression circuits in accordance with the selected ultrasonic vibrating element.

14. An apparatus according to claim 11, wherein said pulse compressing means comprises a storing means for storing a plurality of reference wave signals each corresponding to respective ultrasonic vibrating elements, and a switching means for selectively reading a reference wave signal corresponding to the selected ultrasonic vibrating element out of said storing means.

15. An apparatus according to any one of claims 12, 13 & 14, wherein said switching means is switched in conjunction with said further switching means for selecting the chirp signal corresponding to the selected ultrasonic vibrating element.

* * * * *